US006080277A

United States Patent [19]
Oberkofler et al.

[11] Patent Number: 6,080,277
[45] Date of Patent: Jun. 27, 2000

[54] CELLULOSE PARTICLES, METHOD FOR PRODUCING THEM AND THEIR USE

[75] Inventors: Jörg Oberkofler, Seewalchen; Thomas Moser, Linz; Anton Schmalhofer, Vienna; Jeffrey F. Spedding, Anif, all of Austria

[73] Assignee: TFM Handels-Aktiengesellschaft, Chur, Switzerland

[21] Appl. No.: 08/894,314

[22] PCT Filed: Feb. 15, 1996

[86] PCT No.: PCT/EP96/00650

§ 371 Date: Oct. 14, 1997

§ 102(e) Date: Oct. 14, 1997

[87] PCT Pub. No.: WO96/26220

PCT Pub. Date: Aug. 29, 1996

[30] Foreign Application Priority Data

Feb. 21, 1995 [DE] Germany .......................... 195 05 973
Jun. 7, 1995 [DE] Germany .......................... 195 20 804

[51] Int. Cl.$^7$ .................................. D21H 3/48
[52] U.S. Cl. .................................. 162/157.6; 162/164.1; 162/9; 162/164.3; 162/157.7; 162/182; 536/56
[58] Field of Search ........................... 162/9, 157, 164.1, 162/164.3, 182; 536/56–57, 90–92

[56] References Cited

U.S. PATENT DOCUMENTS 4,624,743  11/1986  Gess ..................................... 162/164.1

FOREIGN PATENT DOCUMENTS 53-145892   5/1979   Japan .
1421957   1/1976   United Kingdom .
WO92/19652  11/1992   WIPO .

OTHER PUBLICATIONS

Chem. Abstract 104:20914v ("Water–Soluble Cellulose Derivatives"; Daicel Chemical Industries, Ltd.; *43–Wood Products,* vol. 104, p. 77; ©1986).

Chem. Abstract 92:43522p ("Quaternary Ammonium Derivatives of Cellulose"; Fuji Chemical Co., Ltd.) *43–Wood Products,* vol. 92, p. 83; ©1980).

"Effects of Retention and Drainage Aids on Paper Machine Drainage: A Review" (*Tappi Journal;* L. H. Allen et al.; pp. 79–84; Jul., 1991).

"Cellulose: Structure, Modification, and Hydrolysis" (R. A. Young et al.; Wiley–Interscience Publication; pp. 102–110; ©1986).

*Primary Examiner*—James O. Wilson
*Assistant Examiner*—Howard Owens
*Attorney, Agent, or Firm*—Fay, Sharpe, Fagan, Minnich & McKee

[57] ABSTRACT

Cellulose particles are provided which have cationic groups even in the interior.

27 Claims, 1 Drawing Sheet

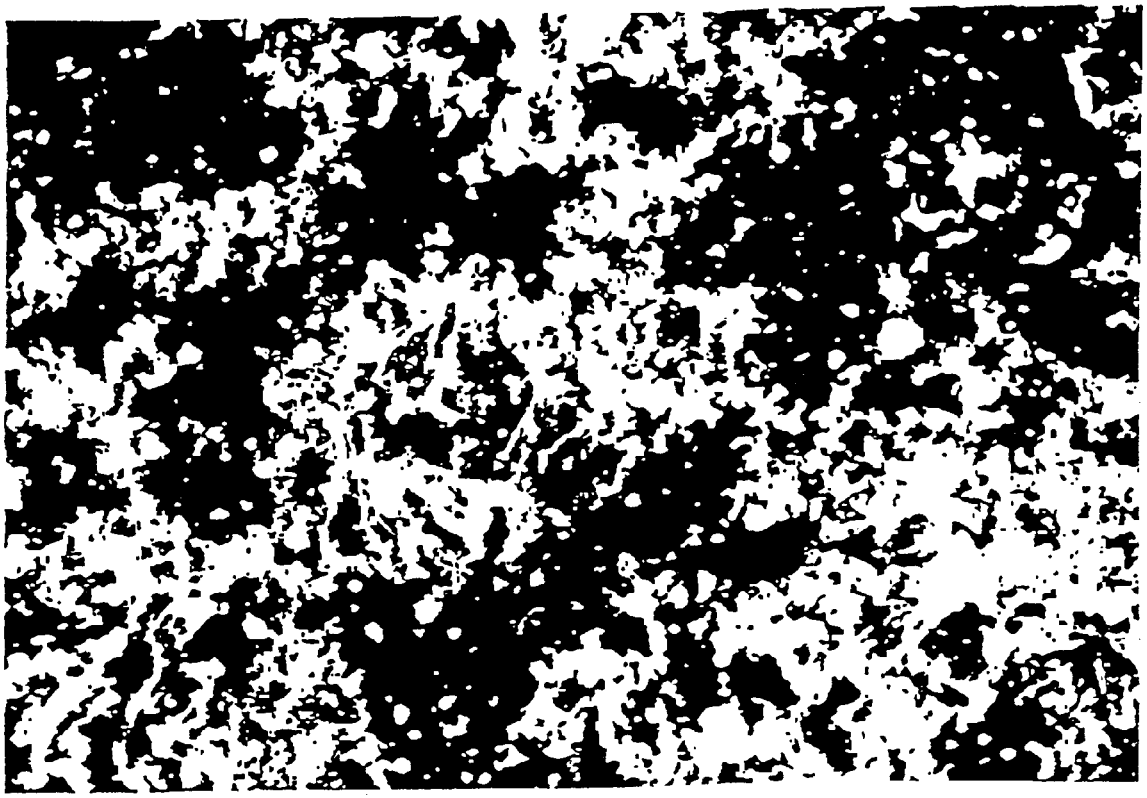
Figure
Dark field image
Enlargement factor: 100

CELLULOSE PARTICLES, METHOD FOR PRODUCING THEM AND THEIR USE

This invention relates to cellulose particles and to a method for producing the same. It further deals with applications of the cellulose particles.

Due to various measures such as circuit concentration, increased use of deinking pulps and high-yield pulps such as wood pulp and TMP (thermomechanic pulp), and neutral processing, there has been a rise in the load of interfering substances (trash) in the water circuits of the paper industry.

Interfering substances were first defined as all those substances which reduce the efficacy of cationic retention aids in the paper stock, i.e. those substances added in order to improve the retention of the fiber/filler mixture on the wire. Recently this definition has been more precisely stated. Interfering substances are thus dissolved or colloidally dissolved anionic oligomers or polymers and nonionic hydrocolloids.

These interfering substances have different effects. They impair the action of retention aids, dry- and wet-strength agents, i.e. substances increasing the strength of the paper, and furthermore lead to deposits in the paper machine circuit, forming and drainage disturbances and a loss of paper strength, whiteness and opacity.

In order to eliminate the adverse effects of these interfering substances on papermaking one uses alum, polyaluminum chloride, low- and high-molecular fixers, cationic starch and inorganic adsorbents. All these substances become attached to the anionic trash with the aid of electrostatic interactions and form complexes therewith. Through binding of these complexes to the fibers or through filtration effects on the wire these aggregates are removed from the paper machine system.

However all these products have their own disadvantages. For example aluminum salts can only be used to a limited extent in neutral processing, which is gaining importance due to the increasing use of calcium carbonate as a filler, since they are not cationically charged and thus not very effective in this pH range.

The use of highly charged, cationic polyelectrolytes in turn involves the problem of exact metering. Otherwise an overcationization of the paper machine circuit and thus cationic dispersion can occur. This means that there can be poor fine-substance retention and reduced sizing.

The problem of the invention is to provide new cellulose particles characterized by special properties and possible applications. The problem of the invention is further to provide cellulose particles which permit interfering substances in the paper circuit, machine circuit or water circuit to be bound in the paper in the greatest possible quantity and thus removed from the circuit without the above-described problems occurring.

The problem of the invention is also to state further possible applications of the cellulose particles.

The invention is based on the finding that this problem can be solved by cellulose particles which have cationic groups even in the interior of the particles.

At least 10%, preferably at least 50%, in particular at least 90%, of the cationic groups are thereby generally present in the interior of the particles. As a result cellulose particles are thus provided which have cationic groups bound to the cellulose distributed over the total cross section of the particles.

So that the particles have sufficient cationicity, at least one cationic group should be present per 100, preferably per 50, anhydroglucose units of the cellulose.

For producing the inventive cellulose particles one reacts the cellulose with a cationizing agent.

The cellulose used can be unsubstituted pulp but also substituted celluloses, in particular cellulose ester or ether such as methyl cellulose, carboxymethylcellulose, cellulose sulfate, cellulose acetate or chitosan. The degree of substitution (DS) should be smaller than 1, that is, no more than one of the three OH groups of the anhydroglucose units of the cellulose should be substituted on the average. The DS must not be too great so that a sufficient number of hydroxyl groups are available for reaction with the cationizing agent. Further, alkali cellulose, in particular sodium cellulose, can be used as cellulose.

The reaction of the cellulose with the cationizing agent can be performed as a solids reaction. The cellulose used can be alkali cellulose which is reacted with the cationizing agent in a kneader.

For producing the inventive cellulose particles the cellulose can also be dissolved and the dissolved cellulose mixed with the cationizing agent, whereupon the cationized dissolved cellulose is precipitated into the cellulose particles.

Dissolving the cellulose can be done by converting the cellulose with sodium hydroxide solution and carbon disulfide into sodium xanthogenate, but also by dissolving it in N-methylmorpholine-N-oxide, lithium chloride dimethylacetamide, tetraammine copper copper(II) hydroxide, cupriethylenediamine or cuprammonium.

N-methylmorpholine-N-oxide monohydrate has a melting point of about 70° C. It can therefore be recovered easily as solids. In contrast to xanthogenate, no bad smell occurs and no waste materials such as sodium sulfate are obtained.

In the case of water-soluble cellulose derivatives one can use water as a solvent. Water-soluble cellulose derivatives are preferably prepared by the viscose process.

The cationic groups can be bound covalently to the hydroxyl groups of the cellulose. However a bond via ionic and/or hydrogen bridges is also possible.

The cationizing agents used can be aluminum salts such as polyaluminum chloride or sodium aluminate. The polyaluminum chloride can be partly hydrolyzed. The aluminate is precipitated together with the xanthogenate with sulfuric acid.

The cationizing agents used can further be cationic polyelectrolytes, such as polydialkyldiallylammonium salts, in particular polydialkyldiallylammonium chloride (poly-DADMAC), dicyandiamide, dicyandiamide condensate, polyamines, polyimines such as polyethylene imine, or ionenes. The cationizing agents used can further be reactive monomers, for example primary, secondary and tertiary amines, quaternary ammonium bases each with at least one residue reacting with a hydroxyl group of the cellulose.

If the cationizing agent does not react with the hydroxyl groups of the anhydroglucose units of the cellulose, as in the case of aluminum salts and cationic polyelectrolytes, the solubility of the cellulose does not change much or at all. In this case the ratio of cationizing agent to cellulose can fluctuate within wide limits. Normally, however, the weight ratio of aluminum salts or cationic polyelectrolytes to cellulose is between 0.03:1 to 1:1 based on the absolutely dry substances (abs. dry).

The reactive monomers, however, are preferably added to the cellulose in a quantity such that the degree of substitution (DS) is no more than 0.2. Otherwise cellulose particles with excessive water solubility can arise.

The cationizing agent with reactive groups, i.e. reactive monomers, used can be in particular 2-chloroethane trimethylammonium chloride or propoxytrimethylammonium chloride.

By precipitating dissolved cellulose with a high degree of substitution, for example carboxymethylcellulose, in an aqueous solution with cationic polyelectrolytes one can likewise obtain the inventive cationized cellulose particles.

Since the cationic charges in the inventive cellulose particles are fixed predominantly in the interior of the particles, one can beat (grind) the particles to make further charges accessible which can act as functional groups.

If reactive monomers are used as a cationizing agent the reactive groups are residues reacting with cellulose hydroxyl groups. The reacting residue can be for example a halogen atom, epoxy groups or imino groups. In order to form an epoxy group, a halogen atom can for example be bound to one carbon atom, and a hydroxyl group to the adjacent carbon atom, of an alkyl residue of the amine or quaternary amronium base. For example the ammonium compound can be 3-chloro-2-(hydroxypropyl)-trimethylammonium chloride.

In order to prevent crosslinking of individual cellulose fibers in particular in the case of dicyandiamide and other polyelectrolytes, the cellulose can be reacted in relatively high dilution with the cationizing agent. That is, when mixed with the cationizing agent the dissolved cellulose is present in a concentration of preferably no more than 2 percent by weight, in particular no more than 1 percent by weight.

Reacting the dissolved cellulose with the cationizing agent is preferably done with stirring, in a time period of for example 10 seconds to 30 minutes depending on the reactivity of the cationizing agent. If the reaction time is too long there is the abovementioned danger of crosslinking.

Precipitating the dissolved cationized cellulose can be done for example through fine spinning jets in precipitation baths.

If the dissolved cellulose used is cellulose xanthogenate, the precipitant can be for example a polyaluminum chloride or sulfuric acid, whereby the sulfuric acid may optionally have salts, e.g. a sulfate such as sodium or zinc sulfate, added.

As has turned out, the cellulose particles can also be obtained by adding a precipitant to the dissolved cationized cellulose with stirring and thus causing precipitation directly in the reactor.

The size of the cellulose particles, or the length of the precipitated cellulose fibers, is then dependent on, among other things, the dilution of the dissolved cationized cellulose and the stirring rate during precipitation.

The particles of cationized cellulose preferably have a mean particle size of 0.001 to 10 mm, in particular a mean particle size of 0.1 to 1 mm. The particles are preferably spherical. However they can also exist in the form of fibers.

A desired size and structure of the cellulose particles can in particular also be obtained by beating.

For comminuting the cellulose particles one can use a great variety of beating apparatuses, in particular standard devices for pulp beating such as a Jokro mill, conical refiner or disk refiner. The beaters customarily used for beating paper fibers are also very suitable. Beating causes a substantial enlargement of the cellulose particle surface and thus increased cationicity and efficacy.

The single figure shows cellulose particles in a dark field image. The particles are in a swollen state. The particles are actually spherical in three dimensions but they are squeezed between the slides in the picture. The enlargement factor is 100. The random fibril structure with fibrils in the range of 10 to 50 microns is easily recognized.

When the cellulose particles are used in papermaking the particle size must obviously not be thicker than the paper thickness, while a fiber structure can be advantageous.

When the cationized cellulose fibers are used as a means for fixing the interfering substances in the paper they should not be longer than 0.5 mm in order to rule out forming problems. The cationized cellulose fibers are preferably no longer than 0.1 mm.

For other applications, e.g. as a flocculant, in particular a flocculant for waste-water purification, a mean particle size of 0.1 to 1 mm is usually preferred.

The cellulose particles are used as a solid or in the form of a suspension.

The inventive cellulose particles can be termed water-insoluble. This means that the cellulose particles virtually do not dissolve in water in the usual dwell times and application methods. The dwell times are in the range of minutes.

In the inventive cellulose particles the cationic groups are bound covalently to the cellulose or immobilized within the cellulose membrane. This covalent bond or immobilization prevents any relevant loss of cationic activity during use of the cellulose particles.

The inventive cellulose particles are used as solids, whereby they can contain up to 80% water. It is also conceivable to dry these cellulose particles and use them as dry granules. Alternatively one can use them in the form of a suspension, for example with 3% solids content, or in the form of a paste with higher solids contents up to 20%.

After precipitation of the dissolved cationized cellulose polymer chains the cationic groups are contained in the cellulose particles uniformly distributed over the total cross section thereof.

The cationic groups present in the interior of the cellulose particles are insensitive to mechanical action, being e.g. not removed by the shear forces caused by stirring.

The inventive cationized cellulose particles are an outstanding means for fixing interfering substances in the paper which are present in the water circuits during papermaking.

Use of the cationic cellulose has no adverse effect on the paper properties, unlike known means for fixing interfering substances in the paper such as bentonite.

At the same time the inventive cationized cellulose causes the fine substances, in particular the fine filler particles, to bind with the fibers, thereby improving the fine-substance or ash retention and the distribution of fine substances in the paper and obtaining a more homogeneous sheet. That is, the inventive canionized cellulose permits the fine substances to be retained both on the side of the cellulose particle/filler mixture facing the wire and on the upper side.

Above all else, however, the inventive cationized cellulose causes anionic trash, which (as mentioned above) occurs in greater quantity in the paper machine circuit nowadays, to bond with the cellulose particles of the cellulose particle/filler mixture and thus be discharged from the circuit.

In particular when the inventive cationized cellulose fiber is short, i.e. has a length of e.g. 0.1 mm or less, this in addition demonstrably increases the strength of filled paper, a crucial property for judging paper quality. This is possibly due to the fact that short cationized cellulose particles collect in the spaces between longer cellulose fibers of the paper and form bridges there between the cellulose fibers of the paper.

In the paper industry the inventive cationized cellulose particles can thus be used as a strength-increasing means for filled paper or as a means for fixing interfering substances in the paper, thereby removing these interfering substances from the water circuit.

Furthermore the inventive cationized cellulose particles are a means for retaining fine substances in the paper during papermaking. That is, fine ash or other filler particles or other fine solids particles which are to be incorporated in the paper are retained by the inventive cationized cellulose particles, i.e. protected from being washed out and thus kept in the paper. This achieves increased homogeneity and dimensional stability of the paper. Since the fine substances are bound better, this at the same time reduces the tendency to dust during processing (f the paper. In addition the inventive cationized cellulose particles lead to an increase in strength in filled paper.

The invention thus includes in particular a method for producing paper using a closed water circuit to which the inventive cellulose particles are added. The interfering substances are thereby bound and rendered harmless. One generally adds 0.1 kg of cationized cellulose particles per ton of paper stock (abs. dry). The upper limit is generally 10 kg/ton for reasons of cost.

At the same time the inventive cationized cellulose particles are an outstanding flocculation aid for poorly precipitable organic sludges. The inventive cationized cellulose particles can thus be used in particular as a flocculant for waste-water purification, above all in clarification plants for flocculating digested sludge. Compared to conventional flocculants, in particular polyelectrolytes, the inventive cationized cellulose particles have a greatly enlarged, stable cationic surface on which the substances to be flocculated can be precipitated. In contrast to conventional flocculants one thus obtains a more stable floc which can also be dewatered better.

It has turned out that use of the inventive cellulose particles in combination with water-soluble polymers produces surprising results, both when the cellulose particles are used in sludge drying and when they are used in papermaking.

Especially good results are achieved in combination with cationic, water-soluble polymers. However combinations with anionic or nonionic polymers are also conceivable.

An especially advantageous combination has turned out to be the combination of the inventive cellulose particles with water-soluble cationic polyacrylamide. Along with polyacrylamide one can in particular use polyethylene imine and water-soluble cellulose derivatives, for example cationic hydroxyethylcelluloses or carboxymethylcelluloses.

In sludge drying the inventive, water-insoluble cellulose particles are preferably added in mixture with the water-soluble polymers. However separate addition is equally possible.

Based on the water-soluble polymer, for example polyacrylamide, the addition of inventive cellulose particles can be within very wide limits from 0.1 to 99.9 wt %. However preferred weight percentages of cellulose particles are 1 to 50% preferably 1 to 10%, particularly 2 to 7% and in particular 3 to 5%. The percentage of cellulose particles is determined by the sludge quality, the desired dry content of the sludge and the throughput capacity.

When the inventive cellulose particles are used in combination with a cationic polymer, the two components are preferably premixed, stored and transported dry. Before application, the mixture is dissolved or dispersed in water and charged to the sludge directly without filtration, which is unnecessary for sludge.

This preferred use of the mixture of cellulose particles and polymers is only possible with cationic polymers, not with anionic polymers, since the latter would react with the cationic cellulose particles. Anionic polymers are therefore added separately from the cellulose particles.

When the inventive cellulose particles are used in combination with anionic polymer, the cellulose particles are stored, transported, prepared and metered separately, in a dry form or in the form of an aqueous suspension. The anionic polymer can likewise be stored and transported dry, dissolved in water, or as an emulsion. In any case the two components must be charged to the sludge separately as an aqueous solution or a suspension. One can use either possibility of charging, first cellulose particles or first polymer.

The synergistic effect obtained by the combination of water-soluble polymers and water-insoluble cellulose particles is impressive. The mechanism of action is unknown, however. For example, tests with biological sludge have shown that the use of 94.3 wt % polyacrylamide and 5.7 wt % cellulose particles, rather than the use of pure polyacrylamide, allows an increase in speed of the band press of 62 to 100% and an increase in sludge throughput of 28 $m^3$/h to 33 $m^3$/h.

Other tests aimed at a higher dry content have also shown impressive results. Thus the addition of only 3 wt % cellulose particles to the polyacrylamide used resulted in an increase in dry content after pressing of 48 to 53%.

The combined use of cationic, water-soluble polymers and the inventive water-insoluble cellulose particles has also shown surprising results particularly in papermaking.

In papermaking a separate addition of cellulose particles and water-soluble polymers is preferred. It is advantageous to filter the water-soluble polymer as a solution continuously before the metering point in order to filter out gel particles impairing paper quality. It is better to add the cellulose particles before and the water-soluble polymers only later. In particular it is advantageous to add the cellulose particles in the initial phase of papermaking, while the water-soluble polymers are added in the final phase shortly before sheet formation.

Expressed as time history and assuming a total circulating time of about 90 seconds, the cellulose particles are added in 30 to 60 seconds before the feed of the paper stock to the headbox, and the water-soluble polymers about 10 to 20 seconds before.

The mixture ratio of cellulose particles and cationic polymers is variable within wide limits, for example from 90:10 to 10:90. However it is preferable to add 40 to 60% cellulose particles based on weight. The preferred quantity depends on the grade of paper, among other things. Higher percentages are preferred for paper with little filler.

In papermaking, the cellulose particles are preferably added in the form of a suspension in water, for example a 3% suspension. The polymer solution is added as an aqueous solution, for example in a concentration of 0.2 to 0.8%.

When anionic water-soluble polymers are used in combination with cellulose particles the same mixture ratios and manners of addition or adding times are preferred.

It has turned out that use of the inventive cellulose particles in papermaking can achieve greater quantities of filler in the paper. This is desirable for economic reasons since fillers are cheaper than paper fibers. Fillers achieve better properties, in particular improved opacity and printability.

A further advantage which has emerged from the addition of cellulose particles is improved forming of the paper and thus improved paper quality.

The term "cellulose particles" also refers in this patent application to fibers of any form and length, in particular spun fibers. Cellulose fibers have diverse applications in the industrial and textile field.

The special feature of the inventive fibrous cellulose particles is their greatly improved dyeing behavior. In particular the fibers can be dyed with favorable anionic dyes. The dyed fibers are characterized by particular color fastness, which is due to one fact that the cationic groups reacting with the dyes are immobilized in the cellulose fiber or bound covalently to the cellulose molecules.

The following examples will explain the invention further.

EXAMPLE 1

An 8.5 weight percent, aqueous sodium cellulose xanthogenate solution is diluted with 0.02 N sodium hydroxide in a ratio of 1:25.

250 ml of the diluted sodium cellulose xanthogenate solution is mixed with stirring (350. rpm) with 1 ml of a 40 weight percent, aqueous solution of dicyandiamide.

After five minute of stirring the speed is increased (600 rpm), whereupon 5 ml of an 18 weight percent, aqueous polyaluminum chloride solution is added dropwise.

The precipitated cellulose fibers are washed with water until the supernatant has no more cationic charges.

EXAMPLE 2

100 kg of pulp is converted with 18% aqueous sodium hydroxide into alkali cellulose (AC). 20 kg of 3-Cl-2-hydroxypropanetrimethylammonium chloride is added to the pressed AC. The reaction is performed in the kneader with cooling at 35° C. for 6 hours. Then neutralizing is done with hydrochloric acid and washing with water. The obtained cationized cellulose is dried and beaten to the necessary particle size.

EXAMPLE 3

To detect the cationicity of the cellulose fibers obtained in Example 1 one uses methyl red as an anionic dye. The cationicity of conventional precipitated, unmodified cellulose fibers was compared with the cationized cellulose fibers produced according to Example 1. The fibers were mixed for this purpose with the methyl red solution and then centrifuged. After centrifugation, the color of the fibers and the coloration of the supernatant were judged.

In the cationized cellulose fibers produced according to Example 1 there was a clear coloration of the fibers and at the same time a decolorization of the supernatant, in contrast to unmodified cellulose fibers.

As a control, methylene blue was used as a cationic dye. With the weakly anionic unmodified cellulose fibers a coloration of the fibers was observed, while the cationized cellulose fibers produced according to Example 1 did not color. Also, in the cationized fibers there was no decolorization of the supernatant.

EXAMPLE 4

To check the efficacy of the cellulose fibers produced according to Example 1, paper stock from a woody and ashy production (raw material for natural rotogravure) was mixed with the cationic cellulose fibers produced according to Example 1, whereby sheets were formed by the standard method. Sheet weight, bursting pressure, tear propagation strength and forming in the paper were judged. It turned out that the cationized cellulose fibers produced according to Example 1 had a positive influence on the distribution of fine subscances, including the ash distribution, and the strength and forming in comparison to a simultaneously performed comparative test (without addition of such cationized fibers).

EXAMPLE 5

With cationized cellulose fibers produced according to Example 1 with an average length of about 4 cm, a flocculation test was performed with digested sludge from a waste-water clarification plant which is difficult to flocculate since it is very fine. It turned out that the cationized cellulose fibers yielded good flocculation, a high settling rate and a clear supernatant, whereas a comparative test with a conventional flocculant, namely polyacrylamide, showed only little flocculation.

EXAMPLE 6

An 8.5 weight percent aqueous solution of sodium cellulose xanthogenate was diluted with an aqueous solution of sodium hydroxide (4 g/l) to 4.25% (as cellulose).

The cationizing agent, a 40% aqueous solution of a dicyandiamide formaldehyde condensate resin (a commercially available product from SKW Trostberg, MELFLOCK C3), was diluted with water to 2 weight percent active concentration.

600 ml of the above diluted 2% dicyandiamide formaldehyde condensate resin solution was stirred with a stirrer at 750 rpm and then 940 ml of the above sodium cellulose xanthogenate solution, diluted to 4.25%, was slowly added to the stirred cationizing agent.

This mixture already containing precipitated particles was then slowly added to the precipitation bath. The precipitation bath consisted of 3000 ml of aqueous solution containing 35 g of sulfuric acid (98%), which was likewise continually stirred. In this precipitation bath there was a quantitative precipitation of the product. More acid was added if necessary to ensure a pH of less than 2.

The precipitated, fibrous product was filtered out through a filter-funnel fitted with a fine plastic gauze sieve, taken up and shaken in 1000 ml of deionized water. The pH was adjusted to between 4.5 and 5.5 with diluted sodium hydroxide solution.

The precipitated product was once again filtered out through a filter-funnel fitted with a fine plastic gauze sieve, repeatedly taken up and shaken in 1000 ml of deionized water and filtered until no significant further cationicity could be detected in the supernatant.

During this washing stage, the residual cationicity, if any, was measured by titrating an aliquot against a standardized anionic polymer with a particle charge detector ($\mu$Tek PCD 02), or detected by a suitable dye (ortho-toluidine blue) as an indicator.

The wet product (solids content approximately 12 to 20%) was removed from the filter and then stored in this state.

EXAMPLE 7

An 8.5 weight percent aqueous solution of sodium cellulose xanthogenate was diluted with aqueous sodium hydroxide solution (4 g/l) to 1% (as cellulose).

The cationizing agent, a 40% aqueous solution of a polydiallyldimethylammonium chloride (a commercially available product, FLOERGER FL 45 C), was diluted with water to 1 weight percent active concentration.

2000 ml of che above sodium cellulose xanthogenate solution diluted to 1% was stirred with a high-shear stirrer without allowing air to be drawn into the solution. 600 ml of the above 1% polydiallyldimethylammonium chloride solution was subsequently added to the stirred solution over a 30 second period. The resultant mixture was stirred vigorously for one further minute.

The reaction of the cationizing agent with the cellulose xanthogenate solution causes an immediate and increasing rise in viscosity in the mixture. If, for example, the undiluted substances viscose and poly-DADMAC are mixed together (at the above solids contents) the mixture immediately solidifies, subsequently separating to a solid phase and a liquid phase.

1000 ml of an aqueous solution containing 25 g of sulfuric acid (98%) was added to the stirred mixture and the precipitation thus completed. More acid was added if necessary to ensure a pH of less than 2.

The precipitated, fibrous product was filtered out through a filter-funnel fitted with a fine plastic gauze sieve, taken up and shaken in 500 ml of deionized water. The pH was adjusted to 4.5 to 5.5 with diluted sodium hydroxide solution.

The precipitated product was again filtered out through a filter-funnel fitted with a fine plastic gauze sieve, repeatedly taken up and shaken in 500 ml of deionized water and filtered until no significant cationicity could be detected in the supernatant.

During this washing stage, the residual cationicity, if any, was measured by titrating an aliquot against a standardized anionic polymer with a particle charge detector ($\mu$Tek PCD 02), or detected by a suitable dye (ortho-toluidine blue) as an indicator.

The wet product (solids content approximately 12 to 20%) was removed from the filter and then stored in this state.

EXAMPLE 8

The same procedure as Example 6 was also conducted with a different cationizing agent, a 20 weight percent solution of polyethylene imine (a commercially available product from BASF, POLYMIN SK). The polyethylene imine solution was diluted with water to 2% concentration. 600 ml of this diluted cationizing agent solution was used in the reaction.

EXAMPLE 9

The same procedure as Example 6 was also conducted with a different cationizing agent, a 50 weight percent aqueous solution of a polyamine (a commercially available product, FLOERGER FL 17). The polyamine solution was diluted with water to 2% concentration. 600 ml of this diluted cationizing agent solution was used in the reaction.

EXAMPLE 10

An 8.5 weight percent aqueous solution of sodium cellulose xanthogenate was diluted with aqueous sodium hydroxide solution (4 g/l) to 4.25% (as cellulose).

The cationizing agent, a solution of reactive, cationic monomers (a commercially available product from Raisio, RAISACAT 65), comprised the following ingredients (approximately 70% concentration):

| | |
|---|---|
| 1) 3-Chloro-2-hydroxypropyl-trimethylammonium chloride | ca. 2% |
| 2) 2,3-Epoxypropyl-trimethylammonium chloride | ca. 66% |
| 3) 2,3-Dihydroxypropyl-trimethylammonium chloride | ca. 3% |

2,2 g of the commercial product was diluted to 200 ml with deionized water.

470 ml of the above sodium cellulose xanthogenate solution diluted to 4.25% was stirred at 800 rpm with a propeller stirrer without allowing air to be drawn into the solution. 200 ml of the above diluted cationizing agent solution was subsequently added over a 30 second period into the stirred solution. The resultant mixture was stirred for a further 30 minutes.

670 ml of an aqueous solution containing 18 g of sulfuric acid (98%) was added to the stirred mixture and the precipitation thus completed. More acid was added if necessary to ensure a pH of less than 2.

The precipitated, fibrous product was filtered out through a filter-funnel fitted with a fine plastic gauze sieve, taken up and shaken in 500 ml of deionized water. The pH was adjusted to 4.5 to 5.5 with diluted sodium hydroxide solution.

The precipitated product was once again filtered out through a filter-funnel fitted with a fine plastic gauze sieve, repeatedly taken up and shaken in 500 ml of deionized water and filtered until no significant further cationicity could be detected.

During this washing stage, the residual cationicity, if any, was measured by titrating an aliquot against a standardized anionic polymer solution with a particle charge detector ($\mu$Tek PCD 02), or detected by a suitable dye (orthotoluidine blue) as an indicator.

The wet product (solids content approximately 12 to 20%) was removed from the filter and then stored in this state.

EXAMPLE 11

The same procedure as Example 7 was also conducted with a different cationizing agent, a 40 weight percent aqueous solution of a special, highly branched, polydiallyldimethylammonium chloride. The polydiallyldimethylammonium chloride was diluted with water as in Example 7.

EXAMPLE 12

The same procedure as Example 7 was also conducted with a different cationizing agent, a 48.5 weight percent aqueous solution of a special, low-molecular polydiallyldimethylammonium chloride. The polydiallyldimethylammonium chloride was diluted with water to 1% concentration as in Example 7.

EXAMPLE 13

The same procedure as Example 6 was also conducted with a different cationizing agent, a 40 weight percent solution of a copolymer of diallyldimethylammonium chloride and acrylic acid, the monomer component acrylic acid constituting less than 10%. The copolymer solution was diluted with water to 1% concentration in this example.

EXAMPLE 14

An 8.5 weight percent aqueous solution of sodium cellulose xanthogenate was diluted with aqueous sodium hydroxide solution (4 g/l) to 2% (as cellulose).

The cationizing agent, a 29% aqueous solution of a polyaluminum chloride (a commercially available product from Ekokemi, EKOFLOCK 70), was used in undiluted form.

1000 ml of the above sodium cellulose xanthogenate solution diluted to 2% (as cellulose) was stirred with a propeller stirrer vigorously but without allowing air to be drawn into the solution. 21 ml of the above undiluted cationizing agent solution was subsequently added to the stirred solution over a 30 second period. The resultant mixture was stirred vigorously for one further minute.

1000 ml of an aqueous solution containing 20 g of sulfuric acid (98%) was added to the stirred mixture and the precipitation thus completed. More acid was added if necessary to ensure a pH of less than 2.

The precipitated, fibrous product was filtered out through a filter-funnel fitted with a fine plastic gauze sieve, taken up and shaken in 500 ml of deionized water. The pH was adjusted to 3 to 4 with diluted sodium hydroxide solution.

The precipitated product was once again filtered out through a filter-funnel fitted with a fine plastic gauze sieve, repeatedly taken up and shaken in 500 ml of deionized water and filtered.

The wet product (solids content approximately 12 to 20%) was removed from the filter and then stored in this state.

EXAMPLE 15

An 8.5 weight percent aqueous solution of sodium cellulose xanthogenate was diluted with aqueous sodium hydroxide solution (4 g/l) to 2% (as cellulose).

The cationizing agent, a 45% aqueous solution of a sodium aluminate (a commercially available product from Mare, FIMAR A 2527), was used in undiluted form.

1000 ml of the above sodium cellulose xanthogenate solution diluted to 2% was stirred with a propeller stirrer vigorously but without allowing air to be drawn into the solution. 24 ml of the above undiluted cationizing agent solution was subsequently added to the stirred solution over a 30 second period. The resultant mixture was stirred vigorously for one further minute.

1000 ml of an aqueous solution containing 37 g of sulfuric acid (98%) was then added to the stirred mixture and the precipitation thus completed. More acid was added if necessary to ensure a pH of less than 2.

The precipitated, fibrous product was filtered out through a filter-funnel fitted with a fine plastic gauze sieve, taken up and shaken in 500 ml of deionized water. The pH was adjusted to 3 to 4 with diluted sodium hydroxide solution.

The precipitated product was once again filtered out through a filter-funnel fitted with a fine plastic gauze sieve, repeatedly taken up and shaken in 500 ml of deionized water and filtered. The wet product (solids content approximately 12 to 20%) was removed from the filter and then stored in this state.

EXAMPLE 16

The same procedure as Example 7 was also conducted with a modified cellulose (sodium methyl cellulose xanthogenate). Low-substituted, water-insoluble methyl cellulose was used instead of the unmodified cellulose.

EXAMPLE 17

A solution of cellulose in lithium chloride, dimethyl acetamide (DMA) and water is prepared as follows.

Cellulose pulp which has been bleached and stored moist is added to a mixture of lithium chloride and dimethyl acetamide so that the components are present in the following ratio: 5 parts cellulose (dry weight), 11 parts lithium chloride, 82 parts dimethyl acetamide and some water (from the moist pulp).

This mixture is homogenized with a high-shear stirrer, and heated under vacuum over a water bath until the water content of the mixture is less than 3%. A dry nitrogen trickle-sparge is used to aid water removal.

The resultant suspension is cooled in a refrigerator to 5° C. and held for a day at this temperature. Periodic stirring aids dissolution of the suspended cellulose. The resultant solution is warmed to 50° C. and filtered through a fine sieve.

A 40 weight percent, aqueous solution of a polydiallyldimethylammonium chloride (a commercially available product, FLOERGER FL 45 C) is used as the cationizing agent.

Based on dissolved cellulose, 10% cationizing agent (as an active substance) in undiluted form is added slowly with continuous mixing. The small amount of water introduced into the solution with the cationizing agent normally does not interfere with the solution equilibrium of cellulose-lithium chloride-dimethylacetamine-water so that the cellulose does not precipitate but the viscosity of the resultant mixture begins rapidly to rise and the next stage follows immediately.

The resultant mixture, at a temperature of 50° C., is poured into the vortex region of a stirred aqueous precipitation bath whereby the cationized cellulose precipitates out.

The precipitated, fibrous product is filtered out of the mixture through a filter-funnel fitted with a fine plastic gauze sieve.

The filtered out product is shaken in deionized water and refiltered. This washing process removes residual amounts of salts and DMA from the product.

The product is once again washed with deionized water and filtered. This process is repeated until no significant further cationicity in the filtrate water can be detected.

The wet product (solids content approximately 12 to 20%) is removed from the filter and then stored in this state.

EXAMPLE 18

A solution of cellulose in N-methylmorpholine-oxide (NMMO) was prepared as follows.

An NMMO/water mixture is analyzed for water content. This is normally around 30% water at this stage.

Pure cellulose in powder form was added to the above mixture at a level to give 3.6 weight percent (based on NMMO). This mixture was then placed in a vacuum flask fitted with a stirrer and a sparge pipe which is used to trickle-feed dry nitrogen gas under the liquid surface. The flask was then heated to 95° C. in a water bath. A vacuum was applied, the stirrer was turned on and a small quantity of nitrogen was allowed to bubble through the liquid phase, thus progressively removing water.

At a certain concentration of water and NMMO (approx. 88% NMMO) the cellulose dissolves. The nitrogen purge and vacuum pump were then stopped. In this experiment a 40% solution of a polydiallyldimethylammonium chloride (a commercially available product, FLOERGER FL 45 C) was used as a cationizing agent.

Based on dissolved cellulose, 10% cationizing agent (as an active substance) was added in undiluted form to the cellulose solution with stirring. The small amount of water (approximately 0.5%) introduced into the NMMO solution by the cationizing agent normally does not alter the solution equilibrium of cellulose-NMMO/water as to cause precipitation of the cellulose.

The resultant mixture was pumped using a gear-wheel pump through a glass wool packed filter and then through a spinning jet into a water bath, where the cationized cellulose coagulated and could be formed into fibers.

These fibers were filtered off, washed and dried and then cut to approximately 1 cm length.

EXAMPLE 19

A 2 weight percent aqueous solution of carboxymethylcellulose (CMC) having a degree of substitution of approximately 0.55 was prepared and stirred for one hour to ensure complete dissolution of the CMC.

The canionizing agent, a 40% aqueous of a dicyandiamide formaldehyde condensate resin (commercially available from SKW Trostberg, MELFLOCK C3), was diluted with water to 4 weight percent concentration.

1000 ml of the above 2% CMC solution was stirred at 800 rpm with a propeller stirrer and 125 ml of the above aqueous solution of dicyandiamide formaldehyde condensate resin diluted to 4% was subsequently added in a 10 second period. This mixture already containing precipitated cationized cellulose was stirred for a further 5 minutes.

The precipitated product was filtered out through a filter-funnel fitted with a fine plastic gauze sieve, repeatedly taken up and shaken in 500 ml of deionized water and filtered until no significant further cationicity could be detected in the supernatant.

During this washing stage, the residual cationicity, if any, was measured by titrating an aliquot against a standardized anionic polymer solution with a particle charge detector ($\mu$Tek PCD 02), or detected by a suitable dye (ortho-toluidine blue) as an indicator.

The wet product (solids content approximately 12 to 20%) was removed from the filter and then stored in this state.

EXAMPLE 20

The solids content of the cationized cellulose from Example 6 was measured. Enough of the wet product to give 10 g of dry product was taken and made up to 200 g with water. This dispersion was transferred to a Jokro mill and beaten for 10 minutes at 1500 rpm. This type of mill is normally used in a paper laboratory to test the beating characteristics of fibers for papermaking. The above beating parameters are comparable to those used for testing firers for papermaking.

The procedure was also repeated using beating times of 5, 15, 30 and 45 minutes. After measuring the solids content, the beaten particles were diluted to 3 weight percent suspension. The wet product (solids content approximately 3%) was stored in this state.

EXAMPLE 21

The cationicity of the various products from Example 20 was measured by titrating against standardized 0.001 N sodium polyethylene sulfonic acid (Na-PES) using orthotoluidine blue as an end-point indicator.

Alternatively, the cationicity was measured by back titration as follows. Product obtained by the above methods was mixed with an excess amount of standardized 0.001 N sodium polyethylene sulfonic acid (Na-PES) and stirred for one hour. The solids were then centrifuged out and an aliquot of the clear supernatant titrated against 0.001 N polydiallyldimethylammonium chloride (poly-DADMAC) in a particle charge detector. The charge of the product was calculated from the consumption of poly-DADMAC.

The cationicity measured by back titration is normally higher than directly measured cationicity. This can be explained by the fact that during back titration the reagent can penetrate the cellulose structure due to the longer duration and thus react with the less accessible charge carriers.

The following table shows the cationicity of the product from Example 6 as a function of different beating times. One can see that the cationicity increases with an increase in beating time, which can be explained by the fact that longer beating reduces the particle size and thus the specific surface area and the available charge.

| Beating time in Jokro mill (minutes) | Cationic charge (dry product) (micro-equivalents/gram) |
| --- | --- |
| 0 | 251 |
| 5 | 394 |
| 10 | 748 |
| 15 | 911 |
| 30 | 978 |
| 45 | 1027 |

EXAMPLE 22

The nitrogen content of the dry product from Example 6 was measured using the Kjeldahl method.

The nitrogen content of the dried cationizing agent from Example 6 was likewise measured.

The reference value used for nitrogen content was non-cationized cellulose precipitated out in acid as sodium cellulose xanthogenate. However the values were below the detection limit of this method.

By comparing the amount of cationizing agent used and the nitrogen content in the finished product one can derive the yield of the reaction. Depending on the choice of cationizing agent, it is typically between 60 and 90%.

EXAMPLE 23

The solids content of cationized cellulose made with similar raw materials as in Example 6 was measured. Enough of the wet product (solids content 15%) to give 380 g as dry product was added to the pulper of a Sulzer Escher Wyss P 12 laboratory conical refiner. This refiner is normally used in the paper laboratory for testing the beating characteristics of fibers for papermaking.

The above amount of cationized cellulose was filled up with water to 12.5 liters and dispersed for 1 minute. The slurry was then transferred to the refiner section of the apparatus, the entrained air was removed and the product pumped under continuous circulation through the refiner for 5 minutes and thus beaten.

The power setting was kept at 350 watts by an automatic control during beating, the speed of the rotor was 1500 rpm.

The beating energy for processing the cationized cellulose was approximately 0.08 kW/kg.

The above beating parameters are comparable to those which are used for beating fibers for papermaking.

The beating of the product was also conducted with different times (1, 2, 3, 4, 6, 7, 8, 9 and 10 minutes).

After beating, the solids content was measured again, the beaten product was diluted to 3% concentration, and stored in this state.

EXAMPLE 24

The product from Example 6 was dried in a hot air oven at 105° C. until the moisture content was between 4 and 8%. In this form the product could easily be broken up into small lumps, the consistency being comparable to hard bread, and stored for some time in this state.

EXAMPLE 25

The dried product from Example 24 was wetted with water for about 10 minutes and then beaten in a Jokro mill for 10 minutes as described in Example 20. After beating, the solids content was measured again and the beaten product diluted to 3% concentration and stored in this state.

EXAMPLE 26

The dried product from Example 24 was ground in the dry state in a Braun model 4045 coffee mill at the finest setting for 5 minutes and then stored in this state.

EXAMPLE 27

The cationized cellulose from Example 6 was beaten for 10 minutes using the procedure from Example 20. The resultant fine solids particles were filtered out of the beaten slurry onto a microfine synthetic filter cloth and subsequently dried at 90° C. In this state the product could easily be broken up into small lumps, comparable to hard bread, and was stored in this state.

EXAMPLE 28

The product from Example 20 was spun in a laboratory centrifuge for 5 minutes at 1000 rpm. The supernatant aqueous phase was decanted off. The pasty compound remaining in the tubes had a solids content of approximately 18% and was stored in this state.

EXAMPLE 29

The product produced in Example 28 was diluted with water to about 3% and slowly stirred. The very fine, pasty product could thus be dispersed in water again very easily and within a short time.

EXAMPLE 30

The product produced in Example 28 was added to a solution of a water-soluble cationic polyacrylamide (FLOERGER FO 4190) as is used for sludge dewatering. In this case, 50% of the cationized cellulose based on the dry weight of cationic polyacrylamide was added.

The mixture was stirred slowly. The product could thus be dispersed in the polyacrylamide solution very easily and within a short time.

EXAMPLE 31

The dried product from Example 27 was added to water to give a concentration of 3% and stirred for 10 minutes. Then dispersion was performed in a high-shear mixer for 5 minutes, resulting in a homogeneous suspension.

EXAMPLE 32

The product made in Example 20 using a 10 minute beating time was stirred slowly to maintain the uniformly dispersed state of the product. The stirring was turned off and after one hour the cationized cellulose particles were seen to be partially sedimented out.

After several days a sediment paste formed that constituted about one half of the liquid volume. The stirrer was once again switched on whereby this sediment could readily redisperse uniformly in the water.

The thus diluted product, now at approximately 3% solids content, was pumped in a circuit using a diaphragm pump (maximum capacity 23 liters/hour) fitted with ball valves at the suction and delivery sides and with suitable pipework of 16 mm internal diameter. After 24 hours of continuous circulation there was no reduction of the pumping efficiency.

Another portion of the dispersed product (also now at 3% solids content) was pumped in a circuit using a small, screw-feed or "Mohno" pump (maximum capacity 20 liters/hour) fitted with a rubber stator for aqueous media. After 24 hours of continuous circulation there was no reduction of the pumping efficiency.

EXAMPLE 33

Dewatering of Biological Sludge

Cationized cellulose from Example 20 was used as a 3% dispersion in combination with a cationic, water-soluble polyacrylamide-based flocculant used in the prior art for dewatering sludge (commercially available as Allied Colloids, DP7-5636). This accelerated the dewatering of biological sludge and increased the solids content of the dewatered sludge compared to use of the cationic polyacrylamide flocculant alone.

The sludge used in this field test is from a combined municipal/industrial sewage works and contains a mixture of primary and biological sludge. This sludge was taken from a point between the sludge thickener after the anaerobic digester and the final dewatering press, before any precipitants/flocculants were added. The solids content was approximately 2%.

The standard powdery polymer used in this plant was prepared as an aqueous 0.3 weight percent solution. This cationic, water-soluble polymer was chosen as the most suitable product after a series of optimization trials.

The cationized cellulose was diluted with water further to a 0.3% solids content. This means that any mixture of the two products will always have the same concentration of active ingredients.

The following setup was used for the laboratory tests:

1) A Britt-jar drainage test apparatus (see enclosed diagram) was fitted with a preweighed black ribbon filter (Schleicher & Schüll 589, 110 mm diameter, ashless). The sieve normally used in the paper laboratory for dewatering tests and the precision stirrer were not used.

2) The drainage tube, equipped with an off/on valve, was connected using flexible silicone tubing to a vessel placed on a balance. The balance was programmed to send a signal of the registered weight at set time intervals to a computer, where it was recorded. This permitted dewatering curves of filtrate weight against time to be recorded. The collecting vessel was also fitted with a flexible tube to a vacuum pump so that a preset vacuum level was adjustable during dewatering.

3) The precision stirrer supplied with the Britt-jar was installed so that the content of a 500 ml beaker could be stirred.

4) Filter papers (Schleicher & Schüll 589, black ribbon, 110 mm diameter), dosing syringes, balance, drying oven, etc.

The following measuring procedure was used.

A series of flocculant solutions were prepared by mixing 0.3% cationized cellulose dispersion with the 0.3% cationic, water-soluble polyacrylamide (PAA) flocculant to give a range from straight PAA through various mixtures to straight cationized cellulose. The concentration of active ingredients was the same in all mixtures.

500 ml of fresh untreated sludge with 2% solids content was placed in a beaker and stirred at 200 rpm for 1 minute. 15 ml of the flocculant was then added (45 mg) using a syringe. This simulates the dosage used in practice.

The thus treated sludge was mixed slowly for a further 2 minutes. During this time, the vacuum pump was turned on so that the vacuum could stabilize. The filter paper in the Britt-jar was moistened and the balance zeroed.

130 ml of flocculated sludge from the beaker was added to the Britt-jar, thereby forming a layer of sludge approx. 1.5 cm deep. The valve between the Britt-jar and the collecting vessel was opened and the data transmission from the balance to the computer started.

The filtrate weight in the collecting vessel was thus recorded automatically during dewatering. When the sludge was fully dewatered, as seen by a cessation of liquid coming into the collecting vessel and by air being drawn through the sludge into the collecting vessel or, in the case of poor dewatering, by the filter being blocked by fine substances, the test was stopped. The sludge remaining on the filter was tested for solids content. The filtrate was tested for turbidity and for chemical oxygen demand (COD).

The procedure was repeated for various flocculants. The results of filtrate weight were plotted against time for each of the flocculants used. The dry substance content as well as the filtrate turbidity and COD were also tabulated against each flocculant used.

Results:

TABLE 1

(Dewatering speed of sludge)
Dewatering of biological sludge, with various levels of cationized cellulose used in combination with polyacrylamide - Filtrate weights at various times

| | Flocculant system for sludge dewatering tests as percent of particular component | | | | | | | | | |
|---|---|---|---|---|---|---|---|---|---|---|
| % cationized cellulose | 0 | 0 | 1 | 2 | 4 | 6 | 8 | 10 | 50 | 100 |
| % cationic polyacrylamide | 0 | 100 | 99 | 98 | 96 | 94 | 92 | 90 | 50 | 0 |
| Drainage time (minutes) | Weight of filtrate over time (g) | | | | | | | | | |
| 1 | 5 | 31 | 37 | 48 | 50 | 31 | 32 | 27 | 25 | 8 |
| 2 | 5 | 48 | 50 | 55 | 57 | 46 | 45 | 39 | 30 | 10 |
| 3 | 7 | 54 | 56 | 62 | 67 | 50 | 47 | 44 | 31 | 10 |
| 4 | 8 | 58 | 61 | 69 | 75 | 52 | 51 | 46 | 35 | 15 |
| 5 | 10 | 64 | 67 | 73 | 76 | 55 | 53 | 46 | 37 | 17 |
| 6 | 10 | 67 | 69 | 75 | 80 | 58 | 57 | 53 | 42 | 20 |

TABLE 2

(Solids content of dewatered sludge)
Dewatering of biological sludge, with various levels of cationized cellulose in combination with polyacrylamide - Solids content of dewatered sludge

| | Flocculant system for sludge dewatering tests as percent of particular component | | | | | | | | | |
|---|---|---|---|---|---|---|---|---|---|---|
| % cationized cellulose | 0 | 0 | 1 | 2 | 4 | 6 | 8 | 10 | 50 | 100 |
| % cationic polyacrylamide | 0 | 100 | 99 | 98 | 96 | 94 | 92 | 90 | 50 | 0 |
| | Solids content of dewatered sludge (%) | | | | | | | | | |
| | * | 19.6 | 20.8 | 22.7 | 24.2 | 21.9 | 21.5 | 21.0 | 16.1 | * |

Note.
Samples marked * could not dewater in a reasonable time since the filter was blocked by fine substances.

TABLE 3

(Turbidity and COD of filtrate)
Dewatering of biological sludge, with various levels of cationized cellulose used in combination with polyacrylamide - Filtrate turbidity and COD

| | Flocculant system for sludge dewatering tests as percent of particular component | | | | | | | | | |
|---|---|---|---|---|---|---|---|---|---|---|
| % cationized cellulose | 0 | 0 | 1 | 2 | 4 | 6 | 8 | 10 | 50 | 100 |
| % cationic polyacrylamide | 0 | 100 | 99 | 98 | 96 | 94 | 92 | 90 | 50 | 0 |
| | Chemical oxygen demand of filtrate (mg $O_2$/l) | | | | | | | | | |
| COD mg $O_2$/l | 1580 | 1080 | 1060 | 980 | 970 | 1000 | 1040 | 1050 | 1400 | 1590 |
| | Turbidity of filtrate (FNU) | | | | | | | | | |
| Turbidity FNU | +450 | 405 | 400 | 388 | 364 | 393 | 402 | 415 | +450 | +450 |

The replacement of approximately 4% of the water-soluble cationic polyacrylamide by cationized, water-insoluble, beaten cellulose particles yielded a surprising and significant increase in the dewatering speed for this sludge, together with a marked increase in the solids content of the dewatered sludge and a reduction in the turbidity and chemical oxygen demand in the filtrate.

EXAMPLE 34

Dewatering of Primary Sludge

The same test procedure as in Example 33 was used for this sludge except for the following differences.

The cationized cellulose used was that made in Example 7 with poly-DADMAC as the cationizing agent, the cellulose being beaten for 10 minutes by the procedure described in Example 20.

The sludge used in this example was taken from an industrial, mechanical waste-water plant where waste water is normally precipitated, sedimented, the sediment concentrated in a sludge thickener and then, after treatment with a water-soluble cationic polyacrylamide, dewatered on a band press.

The standard product used in this plant is known by the trade name FLOEGER FO 4190. The sludge used for the laboratory tests was again taken from a point between the sludge thickener and the band press, before any flocculant was added. The solids content of this sludge was 2%.

Results:

TABLE 4

(Filtrate weight during dewatering time)
Dewatering of biological sludge, with various levels of cationized cellulose used in combination with polyacrylamide - Filtrate weights at various times

| | Flocculant system for sludge dewatering tests as percent of particular component | | | | | | | | | |
|---|---|---|---|---|---|---|---|---|---|---|
| % cationized cellulose | 0 | 0 | 1 | 2 | 4 | 6 | 8 | 10 | 50 | 100 |
| % cationic polyacrylamide | 0 | 100 | 99 | 98 | 96 | 94 | 92 | 90 | 50 | 0 |
| Drainage time (minutes) | Weight of filtrate from dewatering of sludge (g) | | | | | | | | | |
| 0.5 | 8 | 21 | 22 | 23 | 25 | 26 | 25 | 21 | 18 | 12 |
| 1.0 | 12 | 37 | 40 | 42 | 43 | 44 | 41 | 31 | 24 | 17 |
| 1.5 | 14 | 49 | 52 | 55 | 57 | 58 | 52 | 42 | 30 | 19 |
| 2.0 | 15 | 54 | 56 | 60 | 64 | 67 | 60 | 49 | 35 | 21 |
| 2.5 | 18 | 57 | 58 | 63 | 67 | 72 | 63 | 54 | 40 | 23 |
| 3.0 | 20 | 59 | 60 | 66 | 72 | 76 | 69 | 59 | 46 | 24 |

TABLE 5

(Solids content of dewatered sludge)
Dewatering of biological sludge, with various levels of cationized cellulose used in combination with polyacrylamide - Solids content of dewatered sludge

| | Flocculant system for sludge dewatering tests as percent of the particular component | | | | | | | | | |
|---|---|---|---|---|---|---|---|---|---|---|
| % cationized cellulose | 0 | 0 | 1 | 2 | 4 | 6 | 8 | 10 | 50 | 100 |
| % cationic polyacrylamide | 0 | 100 | 99 | 98 | 96 | 94 | 92 | 90 | 50 | 0 |
| | Solids content of dewatered sludge (%) | | | | | | | | | |
| | * | 32.1 | 33.8 | 34.4 | 37.6 | 42.3 | 38.5 | 35.2 | 27.6 | 23.1 |

Note.
The samples marked * could not dewater in a reasonable time since the filter was blocked by fine substances.

TABLE 6

(Turbidity and COD of filtrate)
Dewatering of biological sludge, with various levels of cationized cellulose used in combination with polyacrylamide - Filtrate turbidity and COD

| | Flocculant system for sludge dewatering tests as percent of the particular component | | | | | | | | | |
|---|---|---|---|---|---|---|---|---|---|---|
| % cationized cellulose | 0 | 0 | 1 | 2 | 4 | 6 | 8 | 10 | 50 | 100 |
| % cationic polyacrylamide | 0 | 100 | 99 | 98 | 96 | 94 | 92 | 90 | 50 | 0 |
| | Chemical oxygen demand of filtrate (mg $O_2$/l) | | | | | | | | | |
| COD mg $O_2$/l | 1250 | 890 | 880 | 810 | 740 | 790 | 870 | 880 | 1120 | 1150 |
| | Turbidity of filtrate (FNU) | | | | | | | | | |
| Turbidity FNU | +450 | 320 | 308 | 285 | 252 | 267 | 312 | 338 | 401 | 449 |

The replacement of approximately 6% of the water-soluble cationic polyacrylamide by cationized, water-insoluble, beaten cellulose particles yielded a surprising and significant increase in the dewatering speed for this sludge, together with a marked increase in the solids content of the dewatered sludge and a reduction in the turbidity and chemical oxygen demand in the filtrate.

EXAMPLE 35
Coagulating Agent in Waste-Water Treatment

The wash water from a paper coating machine often contains anionically charged latex which is a constant problem as a interfering substance when this wash water is reused in paper manufacture, as is desirable. It is normally required that this wash water be coagulated by neutralization so that it can be reused as dilution water on a paper machine or passed into the waste-water purification plant.

The coagulating agents normally used for this purpose are either based on water-soluble, highly cationic polymers or solutions of multipositive metal ions, or combinations of the two.

This example demonstrates how the addition of cationized cellulose eliminates anionic, colloidal material from the water. Subsequently the sedimentation of these ingredients by treatment with conventional chemicals is also improved.

Waste water from a paper coating machine was taken fresh. By titration with a µTek PCD-02 titrator system, the charge, which was highly anionic, was measured. The turbidity and the chemical oxygen demand were also very high.

As a control, a sample treated with a standard precipitant (polyaluminum chloride (PAC)) was used which was subsequently flocculated with two types of a water-soluble, polyacrylamide (anionic+cationic).

Approximately 10% cationized cellulose, based on the amount of the dry weight of polyacrylamide, was added to the waste-water sample and mixed for a fixed time. Then the normally used amount of PAC was added, followed by the amount of polyacrylamide reduced by the weight of added cationized cellulose (=90% of the standard amount).

The thus treated waste water was poured into a calibrated measuring cylinder and allowed to stand for one hour.

The sludge volume was then measured. A smaller volume indicates a higher, and thus more advantageous, sludge density. The turbidity and chemical oxygen demand were also measured. As this water would normally be reused as process water or alternatively passed into the waste-water purification plant, low turbidity and COD are an advantage.

TABLE 7

(Volume of sediment, turbidity and COD)
Application of cationized cellulose in coagulation and sedimentation of paper coating machine waste water. Analysis of sedimentation in a 100 ml measuring cylinder.

| Coagulation/flocculation system used | Volume of sediment after 1 hr. ml | Turbidity of supernatant liquid FNU | COD of supernatant liquid mg $O_2$/l |
|---|---|---|---|
| none | 30 (poor separation of sediment) | +450 | 1640 |
| PAC + PAA (cationic) | 12 | 44 | 260 |
| PAC + PAA (anionic) | 14 | 36 | 290 |
| cat. cellulose + PAC + PAA (cationic) | 10 | 35 | 230 |
| cat. cellulose + PAC + PAA (anionic) | 10 | 33 | 220 |

Surprisingly, the pretreatment of the waste water with cationized cellulose clearly improved the sedimentation, turbidity and COD over those levels obtained with the standard system. These positive properties were detected in combination with both cationic and anionic PAA.

EXAMPLE 36

Paper Manufacturing

Cationized cellulose from Example 6 was beaten for 10 minutes as in Example 20 and diluted to 3% suspension. This product was used in a laboratory test rig for paper retention systems either as a substitute or as an additional component, thereby yielding various improvements for the papermaking process.

Retention/Fixation

A Britt-jar drainage tester was used.
Part 1) Application in woodfree, fine paper stock In the first part of this example, a synthetic paper stock was prepared from a mixture of woodfree, beaten, short and long fibers together with ground calcium carbonate filler. This thick stock was diluted, salts were added to adjust the conductivity, and the pH was adjusted to neutral. The stock, when filtered, had a negative charge due to the dissolved or colloidally dissolved substances (anionic trash).

This anionic charge is measured as cationic demand and results from titrating an aliquot of the filtrate against a standardized cationic polymer (0.001 N polyethylene imine) in a particle charge detector, or using suitable color indicators such as ortho-toluidine blue as an end-point indicator.

A series of drainage tests was carried out using various retention systems and also replacing individual components of these systems by the cationized cellulose explained above. These drainage tests were conducted with the Britt-jar stirrer in operation.

In tests using cationized cellulose as part of the retention system, this component was added before the second component, a water-soluble polymer. The second component was only added shortly before the start of the dewatering phase.

The Britt-jar filtrate (A) was tested for solids content by being filtered through a preweighed, ashless filter paper giving a second filtrate (B). The filter paper was ashed to determine the content of filler retention. The second filtrate (B) was tested for chemical oxygen demand (COD), for turbidity, and for residual anionic charge or cationic demand, as described above.

The results of this test series are shown in Table 8.

TABLE 8

Effect of cationized cellulose combined with water-soluble polymer on total retention, filler retention, etc. Britt-jar test - woodfree, fine paper stock, carbonate filler, neutral conditions

| | Britt-jar filtrate | | post-filtered Britt-jar filtrate | | |
|---|---|---|---|---|---|
| Retention aid system | total solids g/l | filler content g/l | turbidity FNU | CSB mg $O_2$/l | cationic demand mg PSK/l |
| | | | FNU | mg $O_2$/l | mg PEI/l |
| no retention aid (blank) | 2.03 | 1.14 | 445 | 1060 | 49 |
| 0.6% cationic polyacrylamide | 1.71 | 1.17 | 294 | 810 | 9.6 |
| 0.3% cationic polyacrylamide + 1.0% bentonite | 1.59 | 1.22 | 432 | 790 | 18 |
| 0.3% cationized cellulose + 0.3% cationic polyacrylamide | 1.34 | 0.95 | 297 | 770 | 8.7 |

Part 2) Application in a groundwood/deink containing stock

In the second part of the test series, paper stock was taken as thick stock directly from a paper machine mixing chest. This stock contained groundwood pulp, deinking pulp, a small amount of pulp fibers together with china clay as a filler and was diluted to 1% consistency.

The same test procedure as above was conducted on this stock. This time a water-soluble polyethylene imine was used as a standard retention aid for the Britt-jar drainage tests. This polyethylene imine, which is also the standard retention aid on the paper machine concerned, was partly replaced by cationized cellulose.

The results of this test series are shown in Table 9.

TABLE 9

Effect of cationized cellulose combined with water-soluble polymer on total retention, filler retention, etc. Britt-jar test - groundwood/deinking/woodfree mixed stock, clay filler, pseudo-neutral conditions.

| | Britt-jar filtrate | | post-filtered Britt-jar filtrate | | |
|---|---|---|---|---|---|
| retention aid system | total solids g/l | filler content g/l | turbidity FNU | CSB mg $O_2$/l | cationic demand mg PSK/l |
| | | | FNU | mg $O_2$/l | mg PEI/l |
| no retention aid (blank) | 8.8 | 6.2 | 237 | 345 | 41 |
| 0.6% polyethylene imine | 7.1 | 5.3 | 128 | 242 | 25 |

TABLE 9-continued

Effect of cationized cellulose combined with water-soluble polymer on total retention, filler retention, etc. Britt-jar test - groundwood/ deinking/woodfree mixed stock, clay filler, pseudo-neutral conditions.

|  | Britt-jar filtrate | | post-filtered Britt-jar filtrate | | |
|---|---|---|---|---|---|
|  | total solids g/l | filler content g/l | turbidity FNU | CSB mg O$_2$/l | cationic demand mg PSK/l |
| 0.3% cationized cellulose + 0.3% polyethylene imine | 6.6 | 5.0 | 94 | 226 | 21 |

The replacement of some of the water-soluble cationic polymer (either polyacrylamide as in Example 1 or polyethylene imine as in Example 2) by cationized, water-insoluble, beaten cellulose particles yields a surprising and significant increase in the retention of fine substances including filler, and reduced turbidity, reduced chemical oxygen demand and anionicity and thus a marked decrease in the dissolved and colloidally dissolved anionic trash in the second filtrate. These improvements are naturally of significant interest to the paper manufacturing process.

Dewatering
Part 3) Application in paper stock (woodfree, fine paper)

In the second series, the Britt-jar was equipped with a larger-diameter drainage spout allowing the drainage speed of the stock to be measured directly as a function of the stock, the aids added and the sieve used. During this modified Britt-jar procedure, the filtrate was collected in a vessel placed on an electronic balance. The balance was programmed to send a signal of the registered weight at set time intervals to a computer, so that dewatering curves of filtrate weight against time could be recorded.

The results of these tests are shown in Table 10. The retention/dewatering system percent refers to dry weight of retention aid on dry weight of paper stock.

TABLE 10

Dewatering of woodfree, carbonate filled, neutral condition paper stock

|  | measured time in sec until definite volumes are reached | | | |
|---|---|---|---|---|
|  | 50 ml | 100 ml | 150 ml | 200 ml |
| retention/dewatering system | Dewatering time (seconds) | | | |
| no retention system | 47 | 125 | 235 | 312 |
| 0.06% cat. poly-acrylamide (PAA) | 13 | 38 | 87 | 141 |
| 0.03% cat. cellulose + 0.03% cat. PAA | 9 | 22 | 52 | 117 |

The replacement of some of the water-soluble cationic polymer normally used (in this case polyacrylamide) by water-insoluble, cationized, beaten cellulose particles yields a surprising and significant increase in the dewatering speed for this paper stock. This means that when applied to a paper machine, the speed and thus the paper production can be increased.

EXAMPLE 37

Cationized cellulose from Examples 6, 7, 8, 9, 10, 11, 12, 13, 14, 15, 16, 17, 18, 19, 25 and 31 was used as a partial replacement of a water-soluble polymer retention system in papermaking and the results compared with each other. As a control, the polymer alone and a blank were used, and a cellulose was also included which was prepared using the procedure of Example 7 but without adding any cationizing agent.

Each product was beaten for 10 minutes by the beating procedure in Example 20 and used as a 3% slurry.

The test procedure used was the method of Example 36, Part 1. Each product was added in a standard concentration of 0.4% cationized cellulose with 0.2% water-soluble polyacrylamide as a retention aid system. The paper stock was also the same as in Example 36, Part 1.

The results are shown in Table 11.

TABLE 11

Britt-jar - comparison of various cationized cellulose products. Retention expressed as solids in Britt-jar filtrate

| cationized cellulose product used - example no. | total solids in Britt-jar filtrate g/l |
|---|---|
| none used (blank) | 4.42 |
| non-cationized cellulose | 4.35 |
| 100% polymer - no cat. cellulose | 3.01 |
| 6 | 2.42 |
| 7 | 2.72 |
| 8 | 2.66 |
| 9 | 3.00 |
| 10 | 3.21 |
| 11 | 2.56 |
| 12 | 2.90 |
| 13 | 2.87 |
| 14 | 2.58 |
| 15 | 2.77 |
| 16 | 2.94 |
| 17 | 2.80 |
| 19 | 2.91 |
| 25 | 2.70 |
| 31 | 2.87 |

In this Britt-jar test the retention was always higher with the use of cationized cellulose than with the polymer alone. This effect could not be detected with the use of non-cationized cellulose.

EXAMPLE 38

Paper Properties

This example demonstrates that by replacing part of conventional retention systems by cationized cellulose one can maintain or improve the strength of the paper sheet with an increased filler content. This is of interest because increased filler content normally reduces paper strength.

Paper sheets were made using a laboratory sheet former. The stock used was basically similar to that used in Example 36, Part 1, that is a mixture of woodfree short and long fibers with calcium carbonate filler.

The cationized cellulose used was that from Example 7, with poly-DADMAC as the cationizing agent and 10 minutes of beating as described in Example 20.

A range of paper sheets were made using various retention systems and part of these retention aids being replaced by cationized cellulose as explained above.

TABLE 12

Properties of paper made on a laboratory sheet former Woodfree, carbonate filled stock. Neutral conditions

| Retention system | Paper grammage g/m² | Filler content % | Porosity to air ml/min | Breaking length km |
|---|---|---|---|---|
| None | 65.1 | 2.2 | 2880 | 5.9 |
| 0.2% cat. PAA + 1.5% bentonite | 66.5 | 13.1 | 2710 | 4.4 |
| 0.6% cat. PAA | 67.4 | 13.9 | 2850 | 4.3 |
| 0.4% cat. cellulose (Ex. 7) + 0.2% cat. PAA | 67.0 | 15.4 | 2980 | 4.4 |

EXAMPLE 39

Fixing Agent for Anionic Trash in Papermaking

The product from Example 14, beaten for 10 minutes as described in Example 20, was used to treat a sample of groundwood papermaking fiber stock to fix anionic trash.

This stock, taken as an approximately 4% stock directly from the incoming fiber stream for a paper machine, contained relatively high levels of anionic trash, such as ligninbased, soluble and colloidally soluble substances that interfere with the papermaking process, especially the retention system.

The efficiency of cationized cellulose as a trash catcher was compared with inorganic, cationic fixing agents (polyaluminum chloride from Ekokemi) and organic, water-soluble cationic polymers (BASF CATIOFAST SL).

It could also be shown that an overdosing of conventional fixing agents can lead to overcationization of the paper machine water circuit, and thus also to adverse effects on retention.

Cationized cellulose was added to 500 ml of the ground-wood stock and mixed for 5 minutes. The thus treated ground-wood stock was subsequently filtered through a Schleicher & Schüll 589 black ribbon filter in a vacuum, and the filtrate was tested for turbidity, chemical oxygen demand and cationic demand.

This anionic charge is measured as cationic demand and results from titrating an aliquot of the filtrate against standardized cationic polymer (0.001 N polyethylene imine) in a particle charge detector or using suitable dyes such as ortho-toluidine blue as an end-point indicator. For overcationized filtrate, a standardized anionic polymer solution (0.001 N Na-PES) was used.

From these first tests, the cationic demand of the ground-wood stock was calculated depending on the fixing agent used, and then twice the particular amount needed was added. The degree of overcationization of the filtrate was measured by titration and is expressed in the table as negative cationic demand.

TABLE 13

Anionic trash fixation in woody paper stock

| Fixing agent | Addition on solids % dry/dry | Turbidity in filtrate FNU | COD in filtrate mg O₂/l | Cationic demand in filtrate mg PSK/l |
|---|---|---|---|---|
| Blank - none | 0 | 268 | 328 | 57.5 |
| Polyaluminum chloride (PAC) | 0.3% | 220 | 312 | 49.7 |
| PAC - overdosed (2× neutrality) | 3.5% | 262 | 326 | −18.8 |
| CATIOFAST SL (organic polymer) | 0.05% | 165 | 302 | 40.2 |
| C. SL - overdosed (2× neutrality) | 0.33% | 191 | 366 | −27.5 |
| Cationized cellulose | 0.1% | 171 | 305 | 47.9 |
| Cat. cell. - overdosed (2× neutrality) | 1.2% | 167 | 278 | 1.3 |

The cationized cellulose from Example 14 exhibits a significant ability to fix anionic trash compared with conventional fixing agents but has the advantage that, due to its water-insoluble nature, it does not lead to overcationizing of the filtrate as occurs with the addition of water-soluble products.

EXAMPLE 40

Dyeing Behavior of Cationic Cellulose Threads

In a dye bath with a concentration of 5 g/l orange II the inventive cationized cellulose of Example 6 or alternatively non-cationized cellulose from the xanthogenate process is dyed. Spun threads with 3 dtex were used. The bath ratio is 1:6. The dyeing took place at room temperature for 30 min. After removal of the spent bath, rewashing with desalinated water and drying are performed.
Measuring results:

| | Extinction of spent bath 1:100 dil. | Whiteness ISO | | |
|---|---|---|---|---|
| | | L | A | B |
| Blank value | 0.3 | | | |
| Non-cat. cellulose | 1.732 | 15.40 | 71.96 | +38.97 | +42.73 |
| Cat. cellulose | 0.461 | 1.38 | 37.74 | +51.23 | +44.58 |

Elrepho 2000 for whiteness/color location measurement
Sample preparation:
The dried thread is wound as uniformly as possible onto a cardboard strip 30 mm wide. The winding thickness must be so high that no change of measured value takes place through the surface of the cardboard.

It turns out during the washes of the samples that the fibrous material consisting of cationized cellulose has much higher color fastness than the non-cationized quality.

We claim:
1. A method for producing cellulose particles comprising cationic groups, wherein the concentration of cationic groups increases or is at least constant from the external surface of the particles to the interior of the particles, and the concentration of cationic groups being such that the ratio of cationic groups to anhydroalucose units in the particles is at least 1:100, said method comprising reacting said cellulose with a cationizing agent selected from the group consisting of aluminum salts, cationic polyelectrolytes, reactive monomers, and combinations thereof, wherein the reactive monomers are primary, secondary, or tertiary amines or quaternary ammonium bases.

2. The method of claim 1, wherein the cellulosic starting material used is unsubstituted pulp, a cellulose ester or ether, carboxymethylcellulose, hydroxyethylcellulose and cellulose sulfate, cellulose acetate, chitosan or alkali cellulose.

3. The method of claim 1, wherein the reaction is performed as a solids reaction.

4. The method of claim 3, wherein the cellulose used is alkali cellulose which is kneaded for reaction with the cationizing agent.

5. The method of claim 1, wherein dissolved cellulose is mixed with a cationizing agent and the cationized dissolved cellulose is precipitated into cellulose particles.

6. The method of claim 1, wherein a solvent used for the cellulose is N-methyl-morpholine-N-oxide, lithium chloride dimethylacetamide and, in the case of water-soluble cellulose derivatives, water.

7. The method of claim 1, wherein the weight ratio of aluminum salts or cationic polyelectrolytes to cellulose is between 0.03:1 to 1:1.

8. The method of claim 1, wherein the reactive monomers are reacted with the cellulose in a ratio such that the degree of substitution is no more than 0.2.

9. The method of claim 1, wherein the aluminum salt used is polyaluminum chloride or an alkali aluminate.

10. The method of claim 9, wherein the cationic polyelectrolytes used are polydialkyldiallylammonium chloride, dicyandiamide, dicyandiamide condensate, polyamines or ionenes.

11. The method of claim 1, wherein the primary, secondary, or tertiary amines or guaternary ammonium bases comprise at least one moiety capable of reacting with an OH group of the cellulose, the moiety selected from the group consisting of a chloride, an epoxy group, and an imino group.

12. The method of claim 11, wherein the reactive monomer is a 2-chloroethane trimethylammonium salt or a propoxytrimethylammonium salt or a mixture thereof.

13. The method of claim 5, wherein the dissolved cellulose when mixed with the cationizing agent is present in a concentration of 0.5 to 4 wt %.

14. The method of claim 5, wherein the dissolved cationic cellulose is regenerated in a precipitation bath.

15. A method for promoting the incorporation of interfering substances in a paper product during manufacturing of the paper product, the method comprising:

providing an aqueous slurry adapted for forming the paper product, said slurry including interfering substances; and adding an effective amount of cellulose particles to the aqueous slurry, the cellulose particles comprising cationic groups wherein the concentration of the cationic groups increases or is at least constant from the external surface of the particle to the interior of the particle, and the ratio of cationic groups to anhydroglucose units in the particle is at least 1:100;

whereby the cellulose particles promote the incorporation of the interfering substances in the paper product.

16. The method of claim 15 wherein the interfering substances include fine substances selected from the group consisting of fine ash, filler particles, fine solid particles, and combinations thereof.

17. The method of claim 15 wherein the effective amount of cellulose particles ranges from about 0.1 kg to about 10 kg of cellulose particles per ton of dry paper product.

18. The method of claim 15 further comprising:

adding a water-soluble polymer to the aqueous slurry.

19. The method of claim 18 wherein the water-soluble polymer is a water-soluble cationic polymer.

20. The method of claim 18 wherein the water-soluble polymer is polyacrylamide.

21. The method of claim 18 wherein the amount of the cellulose particles added to the aqueous slurry ranges from about 40% to about 60% of the total weight of the cellulose particles and the water-soluble polymer.

22. A method for precipitating organic material in a waste water treatment process, the method comprising:

providing waste water having organic material dispersed therein; and adding an effective amount of cellulose particles to the waste water, the cellulose particles comprising cationic groups wherein the concentration of the cationic groups increases or is at least constant from the external surface of the particle to the interior of the particle, and the ratio of cationic groups to anhydroglucose units in the particle is at least 1:100;

whereby at least a portion of the organic material precipitates from the waste water.

23. The method of claim 22 further comprising:

adding a water-soluble polymer to the waste water.

24. The method of claim 23 wherein the water-soluble polymer is a water-soluble cationic polymer.

25. The method of claim 23 wherein the water-soluble polymer is polyacrylamide.

26. The method of claim 23 wherein the amount of cellulose particles added to the waste water ranges from about 1% to about 10% of the total weight of the cellulose particles and the water-soluble polymer.

27. A composition comprising:

a water-soluble polymer; and cellulose particles comprising cationic groups, wherein the concentration of cationic groups increases or is at least constant from the external surface of the particles to the interior of the particles, and the concentration of cationic groups being such that the ratio of cationic groups to anhydroglucose units in the particles is at least 1:100.

* * * * *